Dec. 1, 1953 P. ELIAS 2,661,152
COMPUTING DEVICE
Filed Dec. 18, 1948 4 Sheets-Sheet 1
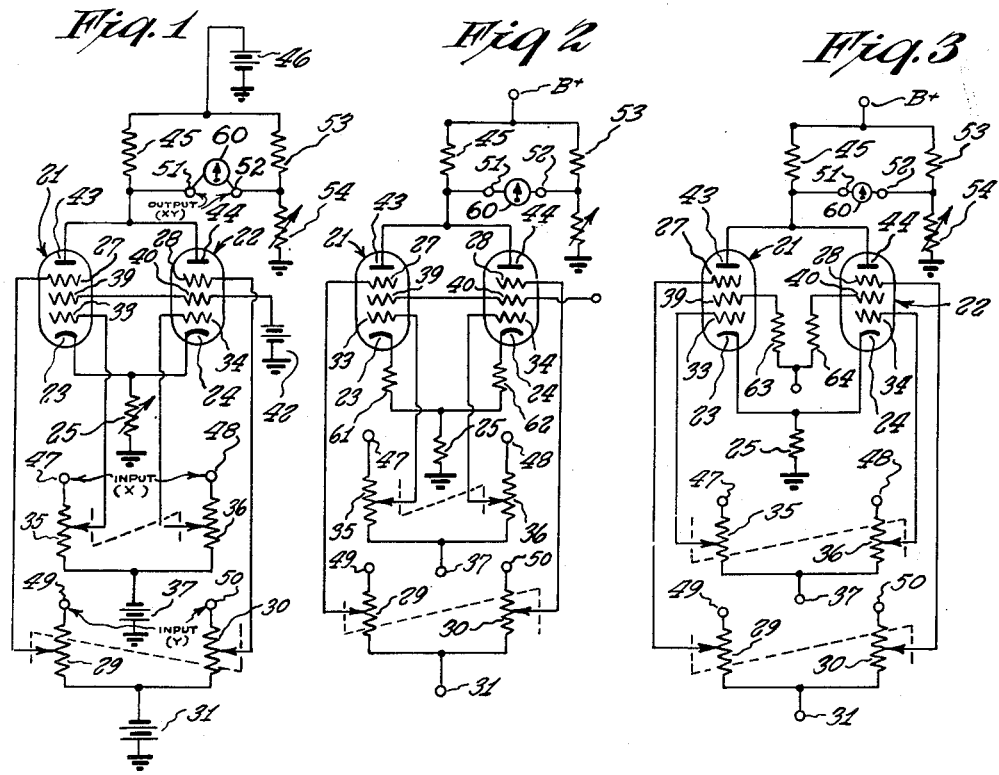
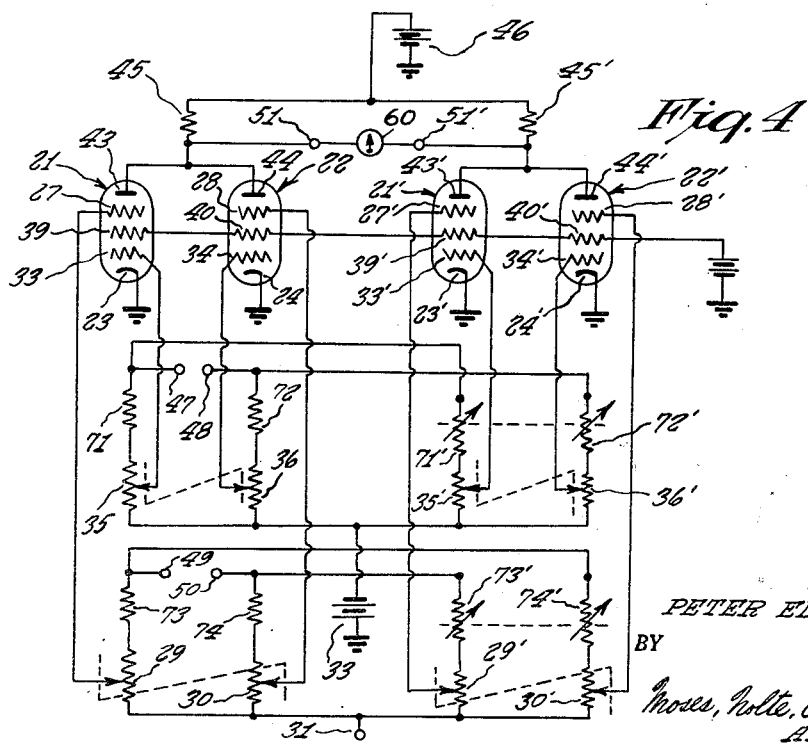
INVENTOR.
PETER ELIAS
BY
Moses, Nolte, Cruwa + Berry
ATTORNEYS Dec. 1, 1953     P. ELIAS     2,661,152
COMPUTING DEVICE
Filed Dec. 18, 1948     4 Sheets-Sheet 2
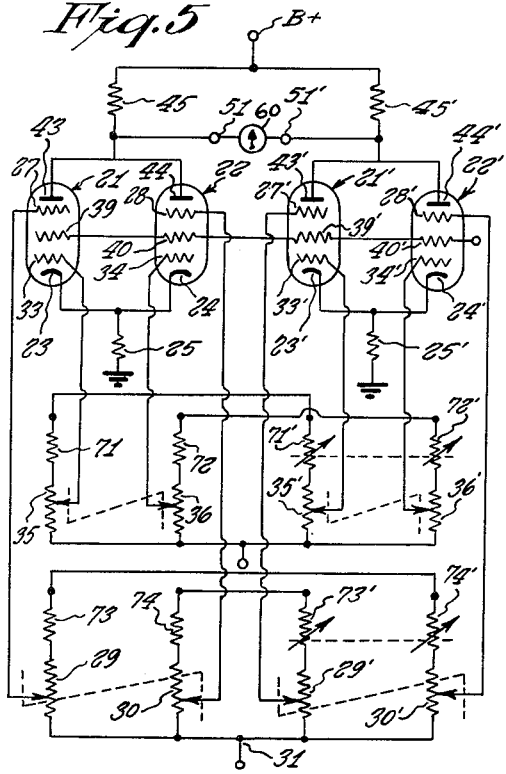
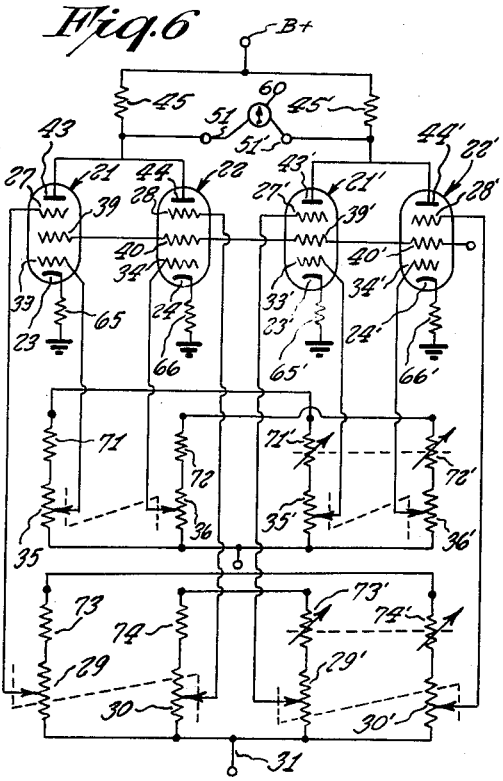
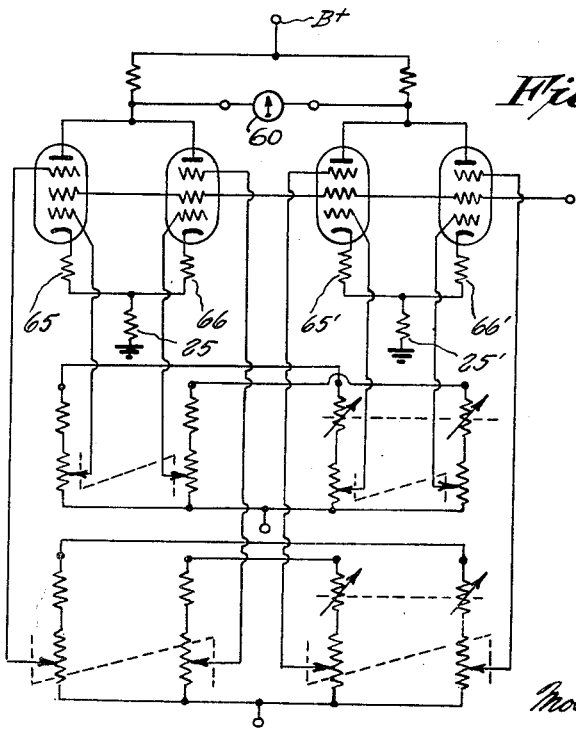
INVENTOR.
PETER ELIAS
BY
Moses, Nolte, Crews & Berry
ATTORNEYS Dec. 1, 1953 P. ELIAS 2,661,152
COMPUTING DEVICE
Filed Dec. 18, 1948 4 Sheets-Sheet 3
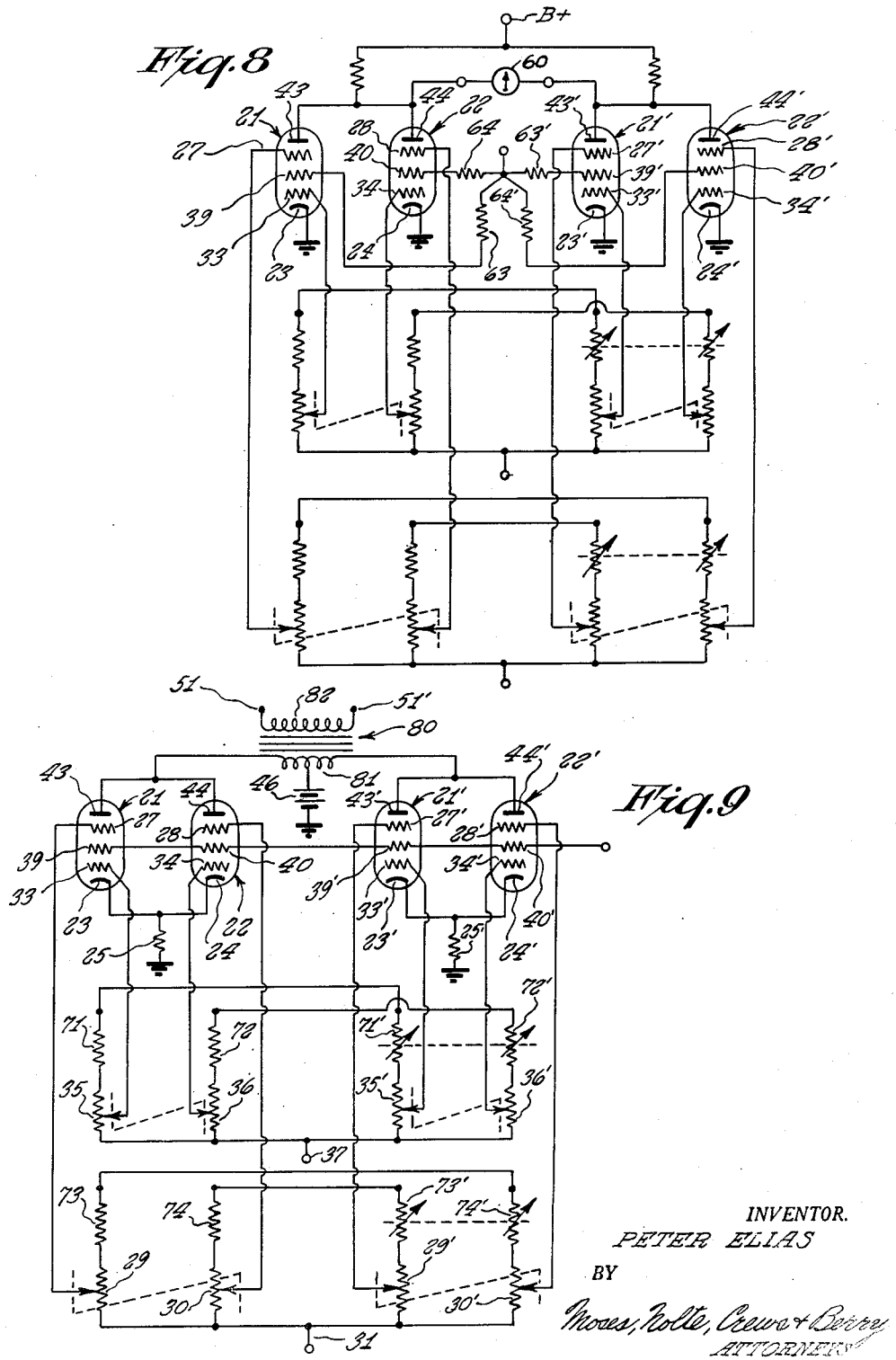
INVENTOR.
PETER ELIAS
BY Dec. 1, 1953     P. ELIAS     2,661,152
COMPUTING DEVICE
Filed Dec. 18, 1948                 4 Sheets-Sheet 4
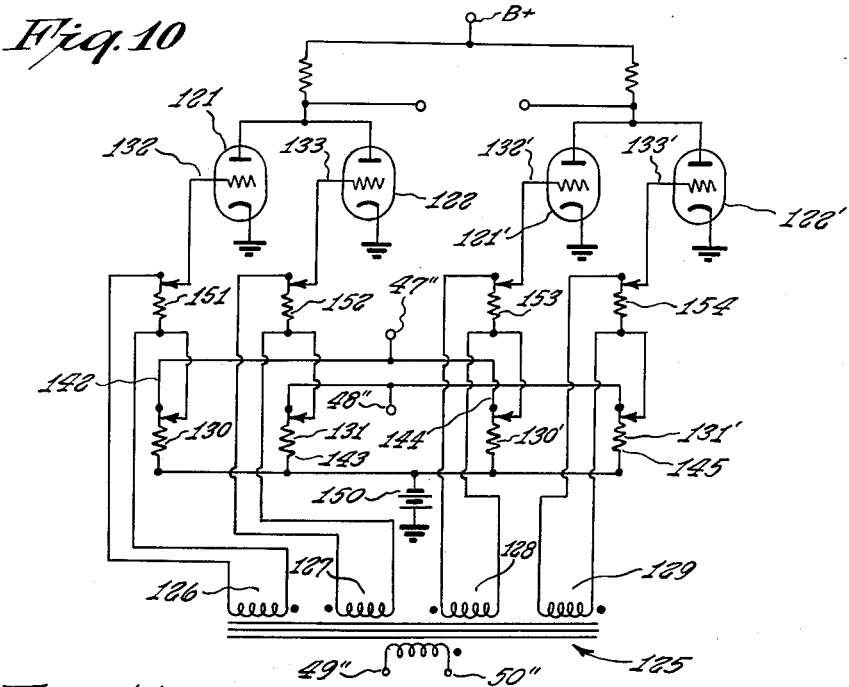
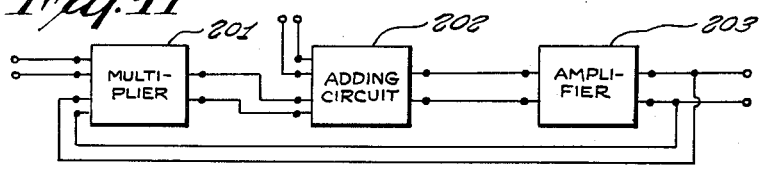
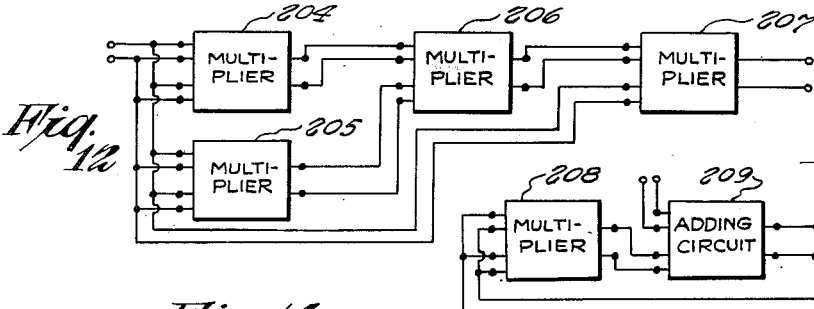
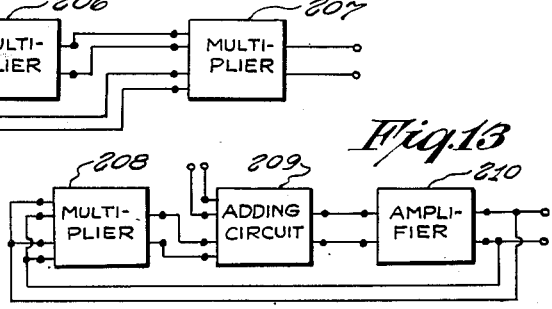
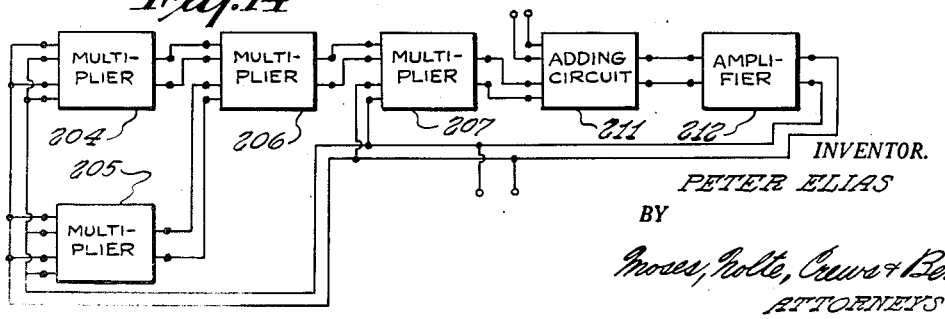
INVENTOR.
PETER ELIAS
BY
Moses, Nolte, Crews & Berry
ATTORNEYS Patented Dec. 1, 1953

2,661,152

UNITED STATES PATENT OFFICE 2,661,152

COMPUTING DEVICE

Peter Elias, Cambridge, Mass.

Application December 18, 1948, Serial No. 66,093

18 Claims. (Cl. 235—61)

The present invention relates to computing devices, and more particularly to devices of this character which will provide a continuous indication of the instantaneous magnitude of the product of two independent variables, either or both of which may vary rapidly with respect to time.

An object of the invention is to provide a computing device of this character which will provide a degree of accuracy comparable to or superior to that obtainable with a conventional slide rule.

A further object of the invention is to provide such a computing device which requires no moving mechanical parts, the computation of the product of the two variables being effected substantially instantaneously by the use of electronic tubes and electrical circuits associated therewith.

Still another object of the invention is to provide an electrical computing device in which the instantaneous product of the two independent variables is derived as an electrical current suitable for use with indicating apparatus permitting its numerical evaluation. Accordingly, this current may be employed with electrical recording apparatus, either separately or in combination with indicating apparatus.

For the purpose of performing the multiplication, each of the two independent variables is expressed as a signal voltage whose instantaneous magnitude is proportional to the magnitude of one of the factors of the product and whose polarity is determined by the positive or negative coefficient of the factor.

Representing these two factors to be multiplied as the signal voltages $x$ and $y$, they may be applied to the circuit of a vacuum tube. This application may be as the algebraic sum of the two voltages applied to a single grid, or the two voltages may be applied separately to individual grids of a multiple grid tube. Assuming that the other electrodes of the tube remain at substantially fixed potentials in accordance with their normal operating conditions, the instantaneous value of the anode current, $i$, will be a continuous function of $x$ and $y$ and may be represented by a power series expansion applicable to any continuous function of two independent variables, namely:

$$i = a + (b_1 x + b_2 y) + (c_1 x^2 + c_2 xy + c_3 y^2) + (d_1 x^3 + d_2 x^2 y + d_3 xy^2 + d_4 y^3) + (e_1 x^4 + e_2 x^3 y + e_3 x^2 y^2 + e_4 xy^3 + e_5 y^4) + \text{terms of higher degree}$$

where $a$ is a residual current which flows when the simultaneous value of both applied signals is zero. If a resistor is included in the anode circuit of the tube, the potential drop across this resistor will at all times be proportional to the magnitude of the current flowing therethrough. Accordingly, the potential drop across such a resistor may be expressed in substantially the same form as the expression given above for the value of the current, $i$. The numerical values for the coefficients in both expressions will be related by a constant factor of proportionality.

By means of the above expansion of the general expression for the value of a function of two independent variables, it may be shown that the outputs of two tubes may be combined in such manner that a current or voltage may be derived from the combined outputs which, for practical purposes, is directly proportional to the instantaneous value of the product of the two variables.

This multiplier unit may also be combined with one or more known units for performing other operations of computation, either separately or in combination with other multiplying units in accordance with the present invention to derive outputs which are proportional to other functions of the two independent variables such as their quotient, for example, or a root or power of a single variable, including powers involving fractional exponents. The various arrangements illustrated can be extended to cover various algebraic functions of one or more variables, the only limitation being practical considerations of size and the necessity for constructing actual physical units which will perform with the required degree of accuracy where numerous successive operations are involved.

Accordingly, a further object of the invention is the provision of a computing device which will instantaneously and continuously indicate the value of an algebraic function of one or more independent variables.

Still another object of the invention is the provision of a circuit comprising corrective features which diminish the effects of inherent inaccuracies of the device and extend its range of useful accuracy.

Other and further objects will become apparent upon reading the following specification together with the accompanying drawing forming a part hereof.

Referring to the drawing,

Fig. 1 is a schematic circuit diagram of an embodiment of the invention in its simplest form.

Fig. 2 is a diagram of a modification of the circuit shown in Fig. 1.

Fig. 3 is a further modification of the diagram of Fig. 1.

Fig. 4 shows a circuit comprising two circuits similar to Fig. 1, combined to extend the range of useful accuracy of the device.

Fig. 5 is a modification of the circuit shown in Fig. 4.

Fig. 6 shows a further modification of the circuit of Fig. 4.

Fig. 7 shows still another modification of the circuit of Fig. 4.

Fig. 8 shows another modification of the circuit of Fig. 4.

Fig. 9 is a modification of Fig. 4 in which a transformer is used instead of certain resistors.

Fig. 10 is a modification of the circuit of Fig. 4 in which a transformer having a plurality of secondary windings is employed.

Fig. 11 is a diagrammatic representation of an arrangement for deriving an output proportional to the quotient of two independent variables.

Fig. 12 is a diagrammatic representation of an arrangement for obtaining an output proportional to a power of a single variable, shown by way of example as the fifth power of such variable.

Fig. 13 is a diagrammatic illustration of an arrangement in which the output is proportional to a root of a single variable, shown by way of example as the square root.

Fig. 14 is similar to Fig. 13, the root in this case being the fifth root.

Referring to Fig. 1, there is shown a pair of pentodes 21 and 22 having their cathodes 23 and 24 returned to ground through a common impedance means indicated illustratively as the cathode resistor 25. Their suppressor grids 27 and 28 are connected through ganged potentiometers 29 and 30 respectively to a suitable source of biasing potential indicated by way of illustration as a battery 31. The control grids 33 and 34 are shown connected through further ganged potentiometers 35 and 36 respectively to another suitable source of biasing potential, similarly illustrated as a battery 37.

The screen grids 39 and 40 are shown connected by a common conductor 41 to a source of screen potential indicated as a battery 42.

Anodes 43 and 44 are connected in multiple through a common impedance or resistor 45 to a suitable source of anode potential indicated as a battery 46.

Terminals 47 and 48, designated "Input $(x)$" are connected to potentiometers 35 and 36 respectively.

Terminals 49 and 50, designated "Input $(y)$" are connected to potentiometers 29 and 30 respectively.

A pair of terminals 51 and 52 is designated "Output $(xy)$." Terminal 51 is connected to anodes 43 and 44, in multiple. Terminal 52 is connected to the junction between resistors 53 and 54. Resistors 53 and 54 are connected in series from the anode supply to ground and resistor 54 is indicated as being adjustable in value. This adjustability permits control of the potential from terminal 52 to ground, so that it may be made equal to that of terminal 51 for purposes of calibration as hereinafter described. A zero-center current indicating device 60 is shown connected to output terminals 51 and 52. This may be a voltmeter or milliammeter of suitable characteristics.

The ganged potentiometers 35 and 36 are substantially identical and are indicated diagrammatically as being mechanically interlinked in such manner that upon movement of one of the adjustable contacts in one direction, the other adjustable contact will be moved by the same amount in the opposite direction. This results in the inclusion of a substantially constant value of resistance between the two adjustable contacts throughout their full range of adjustability. Because of the identical construction of the two potentiometers 35 and 36, the same total portion of the input signal voltage $(x)$ is applied to the two grids 33 and 34, but the zero axis or center point may be adjusted to compensate for differences between the characteristics of the two tubes 21 and 22. This is also true of ganged potentiometers 29 and 30 which are associated with the suppressor grids 27 and 28 of pentodes 21 and 22, respectively.

When the adjustable contacts of potentiometers 29, 30, 35, and 36 are centrally positioned in their ranges of adjustability as indicated in Fig. 1, and an input voltage having a magnitude of $4x$ is applied to terminals 47 and 48, the voltage applied to control grid 33 of pentode 21 will be $x$ and the voltage applied to the control grid 34 of pentode 22 will be $-x$. The values of $x$ and $-x$, of course, represent the change from the normal voltage impressed on these grids by the source of biasing potential 37.

Similarly, if an input voltage having a magnitude of $4y$ is impressed on terminals 49 and 50, the change in voltage on suppressor grid 27 of pentode 21 will be $y$ and the corresponding change in voltage on the suppressor grid 28 of pentode 22 will be $-y$.

Denoting the magnitude of the anode current of pentode 21 as $i_1$ and the magnitude of the anode current of pentode 22 as $i_2$ and the total current flow to both anodes 43 and 44 as I, we may write the following expressions, assuming that the pentodes 21 and 22 are identical in all respects.

$i_1 = a + (b_1x + b_2y) + (c_1x^2 + c_2xy + c_3y^2) + (d_1x^3 + d_2x^2y + d_3xy^2 + d_4y^3) + (e_1x^4 + e_2x^3y + e_3x^2y^2 + e_4xy^3 + e_5y^4) +$ terms of higher degree $i_2 = a - (b_1x + b_2y) + (c_1x^2 + c_2xy + c_3y^2) - (d_1x^3 + d_2x^2y + d_3xy^2 + d_4y^3) + (e_1x^4 + e_2x^3y + e_3x^2y^2 + e_4xy^3 + e_5y^4) +$ terms of higher degree Adding these two expression for $i_1$ and $i_2$ to obtain an expression for the total current I, we have:

$I = i_1 + i_2 = 2a + 2(c_1x^2 + c_2xy + c_3y^2) + 2(e_1x^4 + e_2x^3y + e_3x^2y^2 + e_4xy^3 + e_5y^4) +$ terms of higher degree It will be noted that the terms linear in $x$ and $y$, and all other terms of odd degree, have disappeared in the output I. For small values of $x$ and $y$ the terms of fourth and higher degree become insignificant. For example, by reducing $x$ and $y$ each by a factor of 10 the terms of second degree are reduced by a factor of 100, but the terms of fourth degree or higher are reduced by a factor of 10,000 or more, so that they have less than $\frac{1}{100}$ of their previous relative importance. By suitable choice of the bias voltages of batteries 31 and 37 and the screen voltage of battery 42 for a given value of cathode resistor 25, the coefficients of the terms in $x^2$ and $y^2$ may be made small enough so that the product is the dominant term in the expression for total current I.

In practice of course the two tubes are not identical, and the cancellation of terms of odd degree discussed above is not complete. However, by adjusting the dual potentiometers 29—30 and 35—36 the linear terms in $x$ and $y$ may be completely cancelled. The extent to which terms of higher odd degree then cancel depends on how similar the tubes are. Experimental results obtained with pairs of tubes purchased at the same time but not especially selected for uniformity, showed an output approximately proportional to the product of the input voltages could be obtained in which the higher order odd terms were less important than the terms remaining in $x^2$ and $y^2$. In the experimental arrangement resistors 53 and 54 were connected in series between anode battery 46 and ground, and output terminal 52 was connected to their junction. The variable resistor 54 was adjusted until, with no input voltages applied, the milliammeter 60 connected between output terminals 51 and 52 gave a zero reading.

The experimental results were entirely satisfactory for small values of $x$ and $y$.

Fig. 2 shows a modification of the circuit of Fig. 1 in which the linearity is improved and in which the range of linearity is extended by the inclusion of additional individual resistors 61 and 62 which produce a negative feedback effect. This reduces the magnitude of the coefficients of the $x^2$ and $y^2$ terms in the expression for total current I given above. It also renders the circuit less sensitive to slight variations in supply voltages and to the effects of aging of the tubes.

In Fig. 3, an effect similar to that obtained in Fig. 2 is produced by means of the resistors 63 and 64 which are individually included in the screen circuits of each of the pentodes 21 and 22 respectively.

Compensation for the differences between tubes may be effected in other ways than the manner shown in Figs. 1, 2, and 3. The bias potentials may be made individually adjustable, or the screen potentials may be made individually adjustable. The resistors 61 and 62 in Fig. 2 or the resistors 63 and 64 of Fig. 3 may be made adjustable. The ganged potentiometer arrangement illustrated or some equivalent balanced arrangement is to be preferred, however, since it minimizes interaction between controls.

Fig. 4 shows a further modified form of the invention in which more accurate proportionality throughout a greater range may be obtained by the use of four pentodes 21, 22, 21' and 22'. The arrangement of the circuits is generally similar to that of Fig. 1, two circuits similar to Fig. 1 being combined. In order to permit adjustment of the input voltages so that equalization may be provided to take care of differences in tube characteristics, a pair of fixed resistors 71 and 72 are included in the circuits of potentiometers 35 and 36 respectively. A similar pair of resistors 71' and 72' are included in the circuits of potentiometers 35' and 36', but resistors 71' and 72' are made adjustable so that the distribution of input voltage between the pair of pentodes 21—22 may be adjusted relatively to the input voltage to the pair of pentodes 21'—22'. Within each pair 21—22 or 21'—22', the potentiometers 35—36 and 35'—36' permit adjustment to compensate for differences between the tubes of the pair. Adjustable resistors 71' and 72' are substantially identical in construction and are indicated as being ganged together. The mechanical connection between these adjustable resistors is such that they increase or decrease their resistance values together and to substantially the same extent.

Similarly, resistors 73 and 74 are associated with potentiometers 29 and 30 and ganged adjustable resistors 73' and 74' are associated with potentiometers 29' and 30' for the purpose of adjusting the distribution of the input applied to terminals 49 and 50 between the two pairs of pentodes 21—22 and 21'—22'.

The fixed resistors 71 and 72 are of substantially one-half the maximum value of the ganged adjustable resistors 71' and 72'. Similarly, fixed resistors 73 and 74 are of substantially one-half the maximum value of ganged adjustable resistors 73' and 74'.

Assume the condition where all of the resistors and potentiometers of Fig. 4 are set at the centers of their respective ranges of adjustability, and assume that a first input signal having a voltage value assumed to be $6x$ is applied to terminals 47 and 48. The change in grid potential at grid 33 of pentode 21 will be $x$ and at grid 34 of pentode 22 will be $-x$. Because of the symmetry of the circuits, similar changes of $x$ and $-x$ will occur at grids 33' and 34' of pentodes 21' and 22' respectively.

Correspondingly, assuming a second input signal having a voltage value of $6y$ to be applied to input terminals 49 and 50 of Fig. 4, changes in grid potential of magnitude $y$ will occur at suppressor grids 27 and 28' of pentodes 21 and 22' and a change of potential of magnitude $-y$ will occur at suppressor grids 28 and 27' of pentodes 22 and 21' respectively.

As previously derived for the circuit of Fig. 1, the expression for current in common anode resistor 45 of pentodes 21 and 22 will be $$I'=i_1+i_2=2a+2(c_1x^2+c_2xy+c_3y^2)+\\2(e_1x^4+e_2x^3y+e_3x^2y^2+e_4xy^3+e_5y^4)+$$

terms of higher degree.

In the other pair of pentodes, 21' and 22', however, the second input current is reversed in phase. Representing the current in pentode 21' as $i_3$ and in 22' as $i_4$ and the sum of these two currents, $i_3+i_4$ as $I''$ the following expression may be derived for $I''$.

$$i_3=a+(b_1x-b_2y)+(c_1x^2-c_2xy+c_3y^2)+\\(d_1x^3-d_2x^2y+d_3xy^2-d_4y^3)+\\(e_1x^4-e_2x^3y+e_3x^2y^2-e_4xy^3+e_5y^4)+$$

terms of higher degree.

$$i_4=a-(b_1x-b_2y)+(c_1x^2-c_2xy+\\c_3y^2)-(d_1x^3-d_2x^2y+d_3xy^2-d_4y^3)+\\(e_1x^4-e_2x^3y+e_3x^2y^2-e_4xy^3+e_5y^4)+$$

terms of higher degree.

$$I''=2a+2(c_1x^2-c_2xy+c_3y^2)+2(e_1x^4-\\e_2x^3y+e_3x^2y^2-e_4xy^3+e_5y^4)+$$

terms of higher degree.

If a current indicating device such as the zero center milliammeter 60 be connected between output terminals 51 and 51' of Fig. 4, its deflection will be proportional to the difference between the potential drops across equal resistors 45 and 45', which in turn will be proportional to the difference between the currents $I'$ and $I''$ respectively, flowing in these equal resistors (assuming that the effects of current flow through the milliammeter are sufficiently small so that they may be neglected).

Representing the difference between I′ and I″ as I, this may be expressed by Formula A:

$$I = 4c_2xy + 4(e_2x^3y + e_4xy^3) +$$

terms of higher degree.

It will be noted that in this latter expression which applies to Fig. 4, the cancellation of undesired terms is much more complete than in the earlier expression which applies to Fig. 1. The only uncancelled terms are those containing products of odd powers of $x$ and $y$.

As in the case of Fig. 1, adjustment for differences in tube characteristics may be made by making various resistors individually adjustable. Individual adjustability of biasing potentials may also be used. The arrangement shown, however, minimizes interaction between controls in the course of making such adjustments.

To obtain zero output reading with no input, it has been found possible to adjust either the zero corrector of the indicating instrument 60 which changes the mechanical bias of the hairspring therein, or to vary the value of either of the resistors 45 or 45′ by making one of them adjustable. Individual adjustment of the biasing potential for the pair of pentodes 21—22 or 21′—22′ will also accomplish this result.

Fig. 5 shows a modification of the circuit of Fig. 4 in which the resistors 25 and 25′ are included in the common cathode return circuit of the pairs of pentodes 21—22 and 21′—22′ respectively. The addition of these resistors 25 and 25′ reduces the magnitude of undesired terms containing even powers of $x$ and $y$ in the output circuit of each pair of tubes thereby facilitating balancing.

Fig. 6 illustrates a further modification of the circuit of Fig. 4. Individual resistors 65, 66, 65′ and 66′ are shown included in the cathode return circuits of the pentodes 21, 22, 21′ and 22′ respectively. The circuit of Fig. 6 is otherwise the same as that of Fig. 4. This modification offers further improvement in the range of linearity. Experimentally, the circuit of Fig. 6 has been found to be easier to balance than that of Fig. 4 or of Fig. 5 and also exhibits less tendency to drift out of calibrated conditions.

Fig. 7 shows a further modification of the circuit of Fig. 4 which combines the modifications of Fig. 5 and Fig. 6. Individual cathode resistors 65 and 66 are connected jointly to common cathode resistor 25 for pentodes 21 and 22. Correspondingly, individual cathode resistors 65′ and 66′ are connected jointly to common cathode resistor 25′ for pentodes 21′ and 22′. The values of the resistors may be made smaller while retaining the same linearity as in Fig. 6, thereby improving the sensitivity of the circuit.

The increased stability and enlarged range of linearity of the circuits shown in Figs. 5, 6 and 7 is the result of negative feedback action produced by the cathode resistors used in these circuits.

Fig. 8 shows an arrangement, similar to Fig. 4, in which this degenerative or negative feedback action is obtained by the use of individual resistors 63, 64, 63′ and 64′ shown connected in the circuits of the screen grids 39, 40, 39′ and 40′ of pentodes 21, 22, 21′ and 22′ respectively. This action may be explained as follows. The total space current in the tube is controlled principally by the control grid, such as 33 of pentode 21. If the suppressor grid 27 is made more positive, this increases the portion of the total space current which flows to the anode at the expense of the portion which formerly flowed to the screen grid 39. As a result of this decrease in current flow through the individual resistor 63, the voltage on screen grid 39 rises tending to increase the space current further. The action of the individual screen resistors tends generally to increase stability of operation. The characteristics of the suppressor grid are relatively independent of the aging of the tube and are determined principally by the geometrical configuration of the tube structure. The characteristics of the control grid, which vary considerably during aging of the tube, may be stabilized by degenerative action, using cathode resistors, and/or screen resistors for example, as described above.

The screen resistors may be arranged with certain resistors individual to each pair of tubes and other resistors individual to each tube, as illustrated in the case of the cathode resistors. The use of cathode and screen resistors may also be combined. Such combinations may be effected using combinations of the particular arrangements indicated in Figs. 1 to 8.

The circuits described above are suitable for use with inputs of various types either or both of which may be alternating current inputs, and either or both of which may be direct current inputs of any polarity.

Fig. 9 illustrates a modified form of the invention which is suitable for use where at least one of the inputs will always be obtained from a source of alternating current. In Fig. 9, the equal resistors 45 and 45′ are replaced by a transformer designated generally as 80 which is shown provided with a center-tapped primary winding 81 and a secondary winding 82 connected to the output terminals 51 and 51′. The anode supply 46 is shown connected to the center tap of primary winding 81. Obviously, if two direct current inputs are used, the output will indicate only their variations, and if the $x$ and $y$ inputs are both steady, the output will be zero.

Fig. 10 illustrates a modified form of the invention as shown in Fig. 4, utilizing electron discharge devices or tubes, for example, triodes, and wherein one of the inputs or both, may be obtained from a source of alternating voltage. In Fig. 10, inputs 49″ and 50″ to triodes 121, 122, 121′ and 122′ are from the primary side of transformer 125 further including a plurality of secondary transformers 126, 127, 128 and 129 connected to their associated tubes through resistors 130, 131, 130′ and 131′, variably adjustable and connected within the circuits to control grids 132, 133, 132′ and 133′ of triodes 121, 122, 121′ and 122′.

In the operation of the circuit the two input voltages for each tube are added and their sum applied to the individual control grids of the triodes. One of the input voltages is impressed between input termini 47″ and 48″. Input terminal 47″ is, as shown, connected to one end of the individual potentiometers 142, 144, while terminal 48″ is connected to potentiometers 143 and 145. The other ends of the potentiometers are connected to a biasing supply 150. The variable taps of each potentiometer above are in turn connected in series to potentiometers 151, 152, 153 and 154, which are further connected to the individual triodes of the circuit. As stated, the second voltage input to the circuit, may be directed to a transformer having a plurality of secondary windings. The polarity of the endmost windings, 126 and 129 are in phase, while windings 127 and 128, are out of phase with the input voltage (the dots in the figure represent this arrangement of polarity).

If the variable taps of the potentiometers are placed at the top of their variability, and if the ratio of the transformer primary and secondary windings is 1:1, a voltage of $2x$ impressed at the input terminals 49'', 50'' and a voltage of $2y$ impressed at input terminals 47'' and 48'' will produce an additive voltage $x+y$ at the grid of tube 121; a voltage of $-(x+y)$ at the grid of tube 122; a voltage of $(x-y)$ at the grid of 121' and a voltage $-(x-y)$ at the grid of tube 122'. Then, as shown in the expression of Formula A, if the four tubes are identical, the output voltage taken across the output terminals, will be proportional to the product of the input voltages for certain values of input. If the tubes have different characteristics, then the necessary compensations may be made, as priorly described, by varying the compensating potentiometers of the bias supply of the tubes.

The simplicity of the circuit shown in Fig. 10, has a great many apparent advantages of operation and moreover, can be used where one of the inputs is a steady, or slowly varying voltage, with the other input voltage being rapidly varying.

The various circuits, as illustrated and described in Figs. 1–10, although individually complete in themselves, may have particular applicability, as desired, in combination, so as to produce various desired outputs having a desired readability. For example, in Fig. 11, means for obtaining an output voltage proportional to the instantaneous ratio of two varying input voltages is shown; i:e— $x \div y$. Fig. 11, is an illustrative block diagram, showing how this may be accomplished. The multiplier 201 may be one of the previously described circuits including a transformer output, such as Fig. 9. The output transformer of the multiplier should have one of its secondary termini at ground potential with its polarity so chosen that the ungrounded terminal supplies a voltage proportional to the negative of the product of the two input voltages, $-kyZ$ where $k$ is a positive constant. This voltage is applied to one of the inputs of a conventional adding circuit 202 known to the art, for example, see the book entitled "Electronic Instruments," by Greenwood, Holdam and MacRae (vol. 21 of the Radiation Laboratory Series, McGraw Hill), chapter 3, sections 3.1–3.3 and 3.9, and "Elements of D. C. Analog Computers" by G. A. Korn in Electronics magazine, April 1948, pages 122–7. The second input to the adding circuit is the dividend voltage, $x$. The output of the adding circuit is then $x-kyZ$. This is applied as an input to the amplifier, which is a conventional audio or video amplifier 203 well known to the art. The amplifier produces an output voltage which is A times its input voltage, and is so designed that A is a large number, positive or negative. The output of the amplifier is then applied as the input Z to the multiplier. Therefore:

$$Z = A(x - kyZ)$$

$$Z(1 + Aky) = Ax$$

$$Z = \frac{x}{\frac{1}{A} + ky}$$

It will be noted that, for non-zero $y$, Z may be made as nearly proportional to $$\frac{x}{y}$$

as is desired, by increasing A, the gain of the amplifier.

By applying the same voltage to both inputs of one of the previously discussed multipliers, an output voltage proportional to the square of the input voltage may be obtained. Higher powers may be generated by multiplying the square by the original voltage, multiplying the output (the cube) by the original voltage again and so on, until the desired power is reached, or by multiplying two lower powers to produce a higher power. As an example, Fig. 12 shows in block form an "$n$" power circuit for generating an output voltage proportional to the "$n$" or fifth power of the input voltage. The multipliers 204—207 shown may be any of the priorly discussed circuits.

Again, an output voltage proportional to the square root of an input voltage may be developed by using a feedback arrangement like that used for the quotient. Such a circuit is shown in Fig. 13. The "multiplier" block 208 is connected as in the circuit of Fig. 11 to give an output voltage which is proportional to the negative of the product of the inputs. Both inputs are supplied by the voltage Z. The output is then $-kZ^2$, where $k$ is a positive constant. This is applied as an input to the adding circuit 209 which receives the voltage $x$ as a second input. The output of the adding circuit 209 is $x-kZ^2$. This is applied as an input to the amplifier 210 which produces an output $A(x-kZ^2)$, where as before A is a large number. The output of the amplifier is applied to the two Z inputs of the multiplying circuit 208. Therefore:

$$Z = A(x - kZ^2)$$

$$Z(1 + kAZ) = Ax$$

$$\frac{Z}{A} + kZ^2 = x$$

It will be noted that by making A sufficiently large, $kZ^2$ may be made as nearly equal to $x$ as is desired, so that Z is proportional to the square root of $x$. This will hold for positive $x$ only; if $x$ is negative the feedback will be regenerative and the output Z will increase until the circuits are overdriven. However, reversing the output of the multiplier will then produce an output proportional to the square root of $-x$.

The circuit of Fig. 13 consists essentially of a squaring circuit and a feedback arrangement. Using a circuit which generates $n$th powers, with the same feedback arrangement, $n$th roots may be obtained. The circuit of Fig. 14 uses the fifth power circuit of Fig. 12 to generate an output voltage proportional to the fifth power of the input voltage. Z is the input to the fifth-power generating circuit, and $-kZ^5$ is the output. This is added to $x$ in the adding circuit 211. The sum is amplified by the factor A in the amplifier 212, and the amplifier output is fed to the fifth power circuit input as Z. This gives:

$$Z = A(x - kZ^5)$$

$$Z(1 + AkZ^4) = Ax$$

$$\frac{Z}{A} + kZ^5 = x$$

which as before gives Z proportional to the fifth root of $x$ for sufficiently large A.

The above circuits may be combined with adding circuits and amplifiers to produce a voltage or current proportional to any algebraic function of an input voltage, or of several input voltages, each of which changes with time. In particular, if an input voltage is available which is proportional to time, then an output voltage which is any algebraic function of time may be produced.

There has thus been described, individually and in combination, means for electronically encompassing several manipulations of algebraic functions. Since the invention has been described with reference to only some of the several embodiments thereof, and since other means and apparatus may readily occur to those skilled in the art from a perusual hereof, the scope of the invention is not to be limited by the description but is rather to be obtained from the appended claims.

I claim:

1. A computing apparatus for continuously determining the instantaneous value of the product of two independent variables, one variable being designated $x$ and the other $y$ comprising: a pair of symmetrically connected electron discharge devices, each device having an anode, a cathode and at least two control grids; a first circuit means connecting the pair of anodes to a common source of anode current; a second circuit means symmetrically connecting a first pair of control grids for energization by an electrical voltage whose instantaneous value is directly proportional to one of the independent variables $x$; a third circuit means symmetrically connecting another pair of control grids for energization by an electrical voltage whose instantaneous value is directly proportional to the other independent variable $y$; a fourth circuit means including impedance means common to the two cathodes for completing the anode-cathode circuit of the two discharge devices; and indicating means connected between a point in the first circuit means common to the two anodes and a point of adjustably fixed potential, whereby when two voltages, one being proportional to $x$ and the other proportional to $y$ are applied to the two pairs of control grids and are of suitably small magnitudes, the indication of the indicating means will be proportional to the expression $$(c_1x^2 + c_2xy + c_3y^2) + (e_1x^4 + e_2x^3y + e_3xy^3 + e_4y^4) +$$

terms of higher degree thus being substantially proportional to the instantaneous product of the two variables, the other functions of the two variables being sufficiently small to permit their values to be neglected, said the second and third circuit means each include a resistor to which each voltage is individually applied, and individual adjusting means for each resistor connected to apply a fixed portion of each voltage to each pair of control grids, the adjusting means being connected to apply the fixed portion of each voltage in adjustable ratio directly to each control grid of the pair.

2. A computing apparatus for continuously determining the instantaneous value of the product of two independent variables, one variable being designated $x$ and the other $y$ comprising: a pair of symmetrically connected electron discharge devices, each device having an anode, a cathode and at least two control grids; a first circuit means connecting the pair of anodes to a common source of anode current; a second circuit means symmetrically connecting a first pair of control grids for energization by an electrical voltage whose instantaneous value is directly proportional to one of the independent variables $x$; a third circuit means symmetrically connecting another pair of control grids for energization by an electrical voltage whose instantaneous value is directly proportional to the other independent variable $y$; a fourth circuit means including impedance means common to the two cathodes for completing the anode-cathode circuit of the two discharge devices; and indicating means connected between a point in the first circuit means common to the two anodes and a point of adjustably fixed potential, whereby when two voltages, one being proportional to $x$ and the other proportional to $y$ are applied to the two pairs of control grids and are of suitably small magnitudes, the indication of the indicating means will be proportional to the expression $$(c_1x^2 + c_2xy + c_3y^2) + (e_1x^4 + e_2x^3y + e_3xy^3 + e_4y^4) +$$

terms of higher degree thus being substantially proportional to the instantaneous product of the two variables, the other functions of the two variables being sufficiently small to permit their values to be neglected, said the fourth circuit means further comprises two separate impedance means both connected to the common impedance means and each individually connected to one of the two cathodes for providing a negative feedback effect to stabilize operation of the computing device and to reduce the magnitude of all functions of the two variables other than the product thereof to which the indicating means is responsive.

3. A computing apparatus for continuously determining the instantaneous value of the product of two independent variables, one variable being designated $x$ and the other $y$, comprising: two pairs of symmetrically connected electron discharge devices, each device having an anode, a cathode and at least two control grids; a first circuit means connecting each pair of anodes to a source of anode current; a second circuit means symmetrically connecting a pair of control grids in each pair of discharge devices for common energization by an electrical voltage whose instantaneous value is directly proportional to one of the independent variables $x$; a third circuit means symmetrically connecting another pair of control grids in each pair of discharge devices for common energization by an electrical voltage whose instantaneous value is directly proportional to the other independent variable $y$; a fourth circuit means connecting the four cathodes to complete the anode-cathode circuit of the discharge devices; and indicating means connected symmetrically intermediate the two pairs of anodes, whereby when two voltages, one being proportional to $x$ and the other proportional to $y$ are applied to the four pairs of control grids and are of suitably small magnitudes, the indication of the indicating means will be proportional to the expression $c_2xy + (e_2x^3y + e_4xy^3) +$ terms of higher degree, thus being substantially proportional to the instantaneous product of the two variables, the other functions of the two variables being sufficiently small to permit their values to be neglected.

4. A computing device as in claim 3 in which the second and third circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair.

5. A computing device as in claim 3 in which the fourth circuit means comprises two separate impedance means each common to the cathodes of one pair of discharge devices for producing a negative feedback effect.

6. A computing device as in claim 5 in which each impedance means is a resistor.

7. A computing device as in claim 3 in which the fourth circuit means comprises four separate impedance means each individually connected to one of the cathodes for producing a negative feedback effect.

8. A computing device as in claim 7 in which each impedance means is a resistor.

9. A computing device as in claim 3 in which the fourth circuit means comprises four separate impedance means each individually connected to one of the cathodes and two further impedance means each common to the cathodes of one pair of discharge devices, for producing a negative feedback effect.

10. A computing device as in claim 9 in which each impedance means is a resistor.

11. A computing device as in claim 9 in which each impedance means is a resistor.

12. A computing device as in claim 3 further comprising a screen grid in each discharge device, a source of biasing potential for the screen grids, and four impedance means each individually connected between one of the screen grids and the source of biasing potential for producing a negative feedback effect.

13. A computing device as in claim 3 in which the second and third circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fourth circuit means comprises two separate impedance means each common to the cathodes of one pair of discharge devices for producing a negative feedback effect.

14. A computing device as in claim 3 in which the second and third circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fourth circuit means comprises four separate impedance means each individually connected to one of the cathodes for producing a negative feedback effect.

15. A computing device as in claim 3 in which the second and third circuit means each include a pair of resistors, each variable voltage being individually applied to each pair, and individual adjusting means for each resistor connected to apply a fixed portion of each voltage to each pair of control grids, the adjusting means being connected to apply the fixed portion of each voltage in adjustable ratio directly to each control grid of the pair, and in which the fourth circuit means comprises four separate impedance means each individually connected to one of the cathodes and two further impedance means each common to the cathodes of one pair of discharge devices, for producing a negative feedback effect.

16. A computing device as in claim 3 further comprising a screen grid in each discharge device, a source of biasing potential for the screen grids, and four impedance means each individually connected between one of the screen grids and the source of biasing potential for producing a negative feedback effect, and in which the fourth circuit means comprises two separate impedance means each common to the cathodes of one pair of discharge devices for producing a further negative feedback effect.

17. A computing device as in claim 3 further comprising a screen grid in each discharge device, a source of biasing potential for the screen grids, and four impedance means each individually connected between one of the screen grids and the source of biasing potential for producing a negative feedback effect, and in which the fourth circuit means comprises four separate impedance means each individually connected to one of the cathodes for producing a further negative feedback effect.

18. A computing device as in claim 3 further comprising a screen grid in each discharge device, a source of biasing potential for the screen grids, and four impedance means each individually connected between one of the screen grids and the source of biasing potential for producing a negative feedback effect, and in which the fourth circuit means comprises four separate impedance means each individually connected to one of the cathodes and two further impedance means each common to the cathodes of one pair of discharge devices, for producing a further negative feedback effect.

PETER ELIAS.

References Cited in the file of this patent

UNITED STATES PATENTS

| Number | Name | Date |
|---|---|---|
| 1,869,209 | Mead | July 26, 1932 |
| 1,977,536 | Tubbs | Oct. 16, 1934 |
| 2,306,456 | Mayne | Dec. 29, 1942 |
| 2,425,405 | Vance | Aug. 12, 1947 |
| 2,428,541 | Bogley | Oct. 7, 1947 |
| 2,441,127 | Atkins | May 11, 1948 |
| 2,441,387 | Berger et al. | May 11, 1948 |

OTHER REFERENCES

Theory of Mathematical Machines, Murray, King's Crown Press, 1948, pages 111-13; Waveforms, M. I. T. Radiation Laboratory Series, volume 19, page 668, section 19.2.